United States Patent [19]

Karube

[11] Patent Number: 4,852,114

[45] Date of Patent: Jul. 25, 1989

[54] GAS LASER DEVICE

[75] Inventor: Norio Karube, Machida, Japan

[73] Assignee: Fanuc Ltd., Minamitsuru, Japan

[21] Appl. No.: 176,649

[22] PCT Filed: Jul. 15, 1987

[86] PCT No.: PCT/JP87/00510
§ 371 Date: Mar. 3, 1988
§ 102(e) Date: Mar. 3, 1988

[87] PCT Pub. No.: WO88/00766
PCT Pub. Date: Jan. 28, 1988

[30] Foreign Application Priority Data

Jul. 18, 1986 [JP] Japan .................................. 61-169543

[51] Int. Cl.[4] ................................................ H01S 3/22
[52] U.S. Cl. ...................................... 372/58; 372/107; 372/65; 372/34
[58] Field of Search .................... 372/58, 107, 108, 34

[56] References Cited

U.S. PATENT DOCUMENTS

| 4,592,063 | 5/1986 | Accetta et al. | 372/58 |
| 4,617,667 | 10/1986 | Penn | 372/61 |
| 4,661,958 | 4/1987 | Bowes et al. | 372/34 |
| 4,760,583 | 7/1988 | Sasnett et al. | 372/107 |

Primary Examiner—Léon Scott, Jr.
Attorney, Agent, or Firm—Staas & Halsey

[57] ABSTRACT

A gas laser device in which a laser medium gas is circulated in an airtight container and a laser beam is generated from the gas excited by an electric discharge, includes a main unit (10) including an air blower (13) for circulating the gas, heat exchangers (12a, 12b) for cooling the gas, and a discharging power supply (11). A laser beam emitter (20) includes a discharging unit (23) and resonator reflecting mirrors (21a, 21b). The main unit (10) and the laser beam emitter (20) are separate and spaced from each other. The main unit (10) and the laser beam emitter (20) are interconnected by a gas pipe assembly having a plurality of highly rigid steel pipes and flexible, expandable/contractable, airtight connector members (31a, 31b) connecting the steel pipes.

10 Claims, 5 Drawing Sheets

4,852,114

GAS LASER DEVICE

STATEMENT OF RELATED APPLICATIONS

The present invention is related in subject matter to U.S. Ser. No. 177,660, filed Mar. 7, 1988.

BACKGROUND OF THE INVENTION

1. Field of the Invention

The present invention relates generally to a gas laser device for use in machining, and more particularly, to a gas laser device having a main unit including a power supply, and a laser beam emitter separate from the main unit.

2. Description of the Related Art

Gas laser devices are widely used for cutting and welding metal. Two typical gas laser devices are shown in FIGS. 9 and 10.

FIG. 9 shows a high-speed axial-flow-type gas laser device which includes a laser beam, 61 resonator reflecting mirrors, 62a and 62b a discharge tube, 64a, 64b heat exchangers 64a and 64b for absorbing heat of the discharge gas and discharging the same to cool the gas, an air blower 65 for circulating a laser medium gas, and a DC high-voltage power supply 66 for generating electric discharges in the discharge tube.

In this type of gas laser device, electric discharges are produced in the discharge tube 63 to excite the laser medium gas which flows at a high speed in the tube for thereby causing laser excitation.

FIG. 10 shows an orthogonal-type gas laser device. Those parts which are identical to those shown in FIG. 9 are denoted by identical reference numerals, and will not be described in detail. Discharge electrodes 67a and 67b disposed in an opposing relation to each other.

In this type of gas laser device, electric discharges are generated between the electrodes 67a and 67b to excite a laser medium gas flowing at a high speed between the electrodes for laser excitation.

In order to operate a gas laser device efficiently on a continued basis, the temperature of the gas in a discharging unit must be kept low. Both of the above gas laser device types are equipped with a heat exchanger and an air blower, and a discharging power supply of a substantial size, and hence have a substantial weight and volume as a whole.

Systems for machining workpieces using the above laser devices include a system in which the workpiece is moved and a system in which a laser beam is scanned. In the system in which the workpiece is moved, a machining table is large in size, the machining speed is low, and three-dimensional machining is especially difficult to achieve. Therefore, the system in which the laser beam is scanned and a system in which the workpiece is moved and the laser beam is scanned are mainly relied upon at present.

When the laser beam is scanned, however, the optical distance between the laser device and the workpiece is varied, resulting in lowered machining performance.

SUMMARY OF THE INVENTION

It is an object of the present invention to provide a gas laser device which will solve the above problem and has a main unit including a power supply, and a laser beam emitter separate from the main unit.

To solve the above problems, there is provided in accordance with the present invention a gas laser device in which a laser medium gas is circulated in an airtight container and a laser beam is generated from the gas excited by an electric discharge.

A main unit includes an air blower for circulating the gas, a heat exchanger for cooling the gas, and a discharging power supply.

A laser beam emitter includes a discharging unit and resonator reflecting mirrors and is separate from the main unit; and A gas pipe assembly couples said main unit and said laser beam emitter, and includes a plurality of highly rigid steel pipes and flexible, expandable/contractable, airtight connector members connecting the steel pipes.

Since the laser beam emitter is separate from the main unit, the laser beam emitter may be installed in the vicinity of a laser machining head. The laser beam is not required to traverse a long distance using mirrors providing a folded laser beam passage, and stable machining is made possible.

BRIEF DESCRIPTION OF THE DRAWINGS

FIG. 10(a) is a sectional front elevational view of a conventional orthogonal-type gas laser device; and FIG. 10(b) is a sectional side elevational view of the conventional orthogonal-type gas laser device of FIG. 10a.

DETAILED DESCRIPTION OF THE PREFERRED EMBODIMENTS

Embodiments of the present invention will hereinafter be described in specific detail with reference to the drawings.

Figure 1:
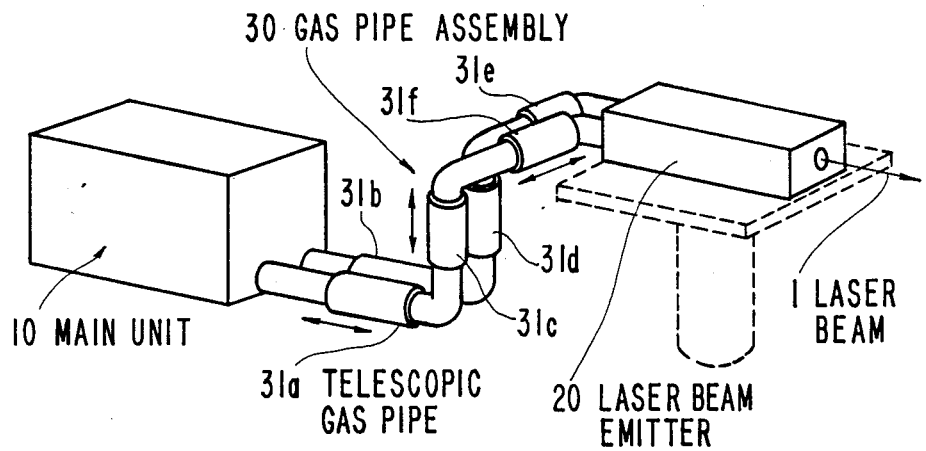
FIG. 1 is a perspective view of a first preferred embodiment of the present invention.
Figure 2:
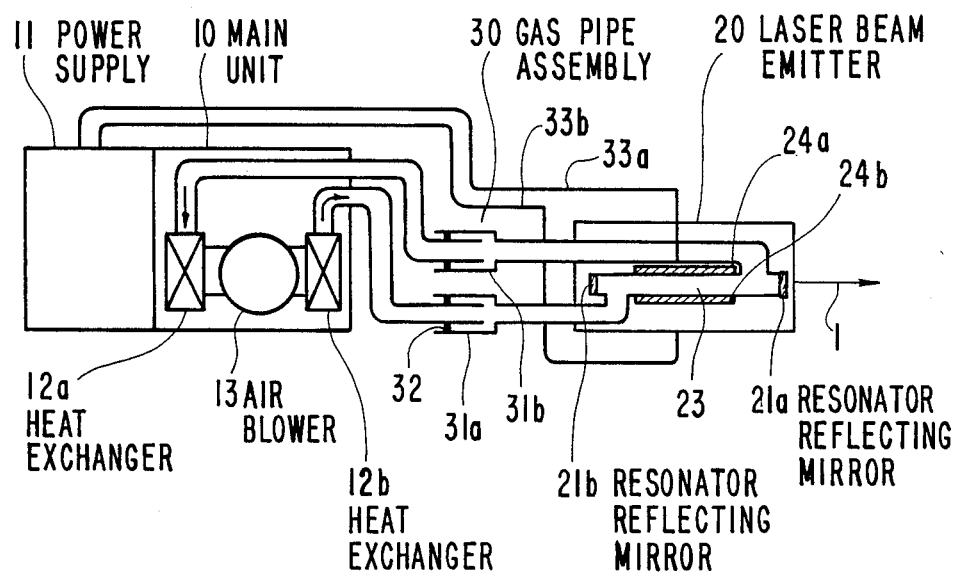
FIG. 2 is a schematic cross-sectional view of the embodiment of FIG. 1.

Referring to FIGS. 1 and 2, a gas laser device includes a laser beam, a main unit 10 including a power supply 11, heat exchangers 12a and 12b, and an air blower 13. A laser beam emitter includes a discharging unit 23 having discharging electrodes 24a and 24b and resonator reflecting mirrors, 21a and 21b and a gas pipe assembly 30 for supplying a laser medium gas from the main unit 10 to the laser beam emitter 20 and returning a high-temperature laser medium gas back to the main unit 10. The gas pipe assembly 30 has gas pipes 31a, 31b, 31c, 31d, 31e, and 31f of telescopic structure for enabling the gas pipe assembly 30 to be expanded and contracted three-dimensionally.

FIG. 2 is a schematic cross-sectional view of FIG. 1. The gas pipes 31c, 31d, 31e, 31f of telescopic structure are omitted from illustration in FIG. 2. Denoted in FIG. 2 at 1 is the laser beam the main unit 10 has a power supply 11, an air blower 13, and heat exchangers 12a and 12b. The arrow in FIG. 2 indicates the direction of flow of the laser medium gas.

The laser beam emitter 20 has resonator reflecting mirrors 21a and 21b for reflecting and resonating the laser beam and discharging electrodes 33a, 33b for generating an electric discharge, and a discharging unit 23 for exciting the laser medium gas.

The gas pipe assembly 30 has the gas pipes 31a and 31b of telescopic structure which include packings 32 for preventing air from being mixed into the laser medium gas. The laser beam emitter 20 is allowed to move laterally in FIG. 2 by the gas pipes 31a and 31b of telescopic structure. As described above, the gas pipes 31c, 31d, 31e and 31f of telescopic structure, which are omitted from illustration in FIG. 2, act similarly to allow the laser beam emitter 20 to move three-dimensionally.

Figure 3:
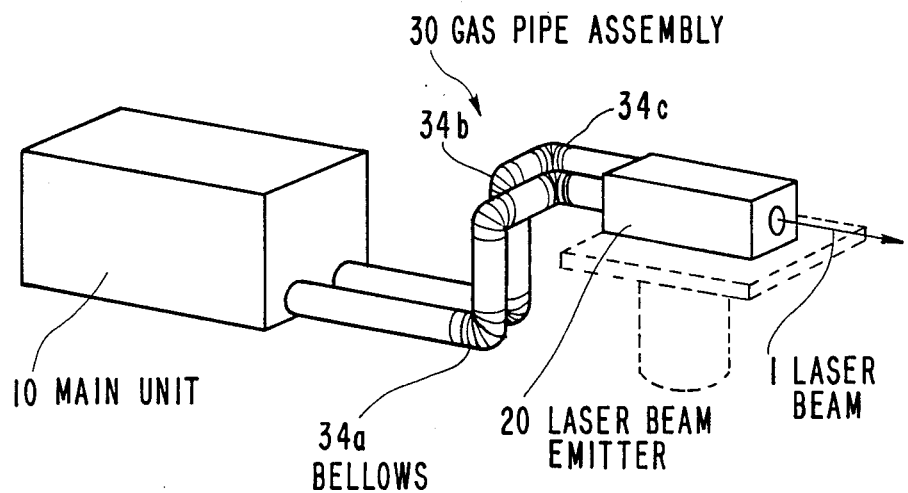
FIG. 3 is a perspective view of a second preferred embodiment of the present invention.

FIG. 3 shows a second embodiment of the present invention. As with FIG. 1, the reference numeral 10 represents a main unit, and 20 a laser beam emitter. In this embodiment, a gas pipe assembly 30 employs flexible bellows 34a, 34b, and 34c as coupling pipes. The bellows are flexible, expandable and contractable for allowing the laser beam emitter 20 to move three-dimensionally.

Figure 4:
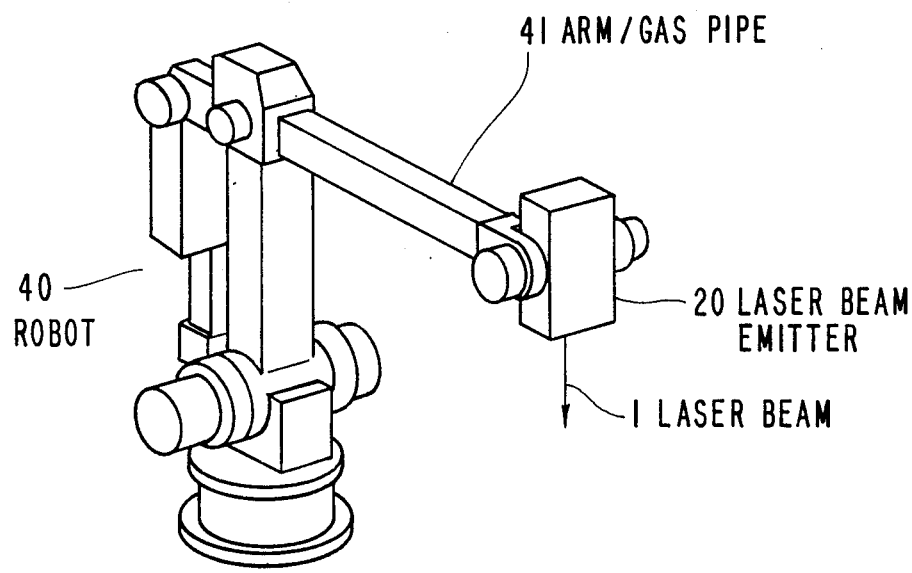
FIG. 4 is a perspective view of a third preferred embodiment of the present invention.
Figure 5:
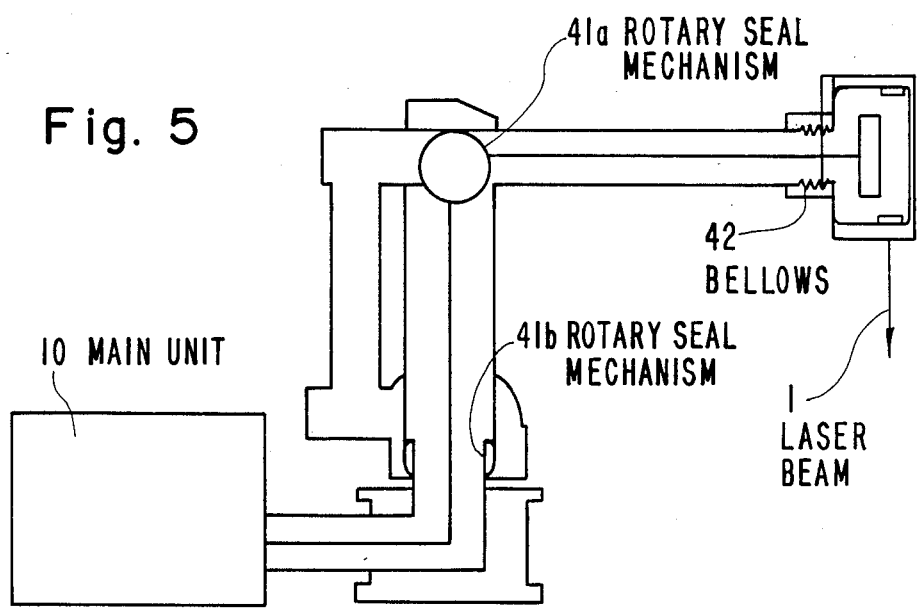
FIG. 5 is a schematic cross-sectional view of the embodiment of FIG. 4.

FIGS. 4 and 5 show a third embodiment of the present invention. In FIG. 4, a laser beam emitter 20 is mounted on the distal end of a robot arm 41 of a robot 40. A gas pipe assembly 30 is incorporated in the arm 41 of the robot 40. Movement of the robot 40 causes the laser beam emitter 20 to move three-dimensionally for machining a three-dimensional workpiece with a laser beam. While the gas pipe assembly 30 is preferably combined with the arm 41 of the robot 40 in as the illustrated embodiment, the gas pipe assembly 30 may be installed outside of and along the arm 41.

FIG. 5 is a schematic cross-sectional view of embodiment of FIG. 4. In this embodiment, the arm 41 serves as a passage for a laser medium gas, and arm joints are sealed from atmosphere. This arrangement eliminates any special laser medium gas pipes, resulting in a reduced number of parts. Denoted in FIG. 5 at 41a and 41b are rotary seal mechanisms, and 42 a bellows.

Figure 6:
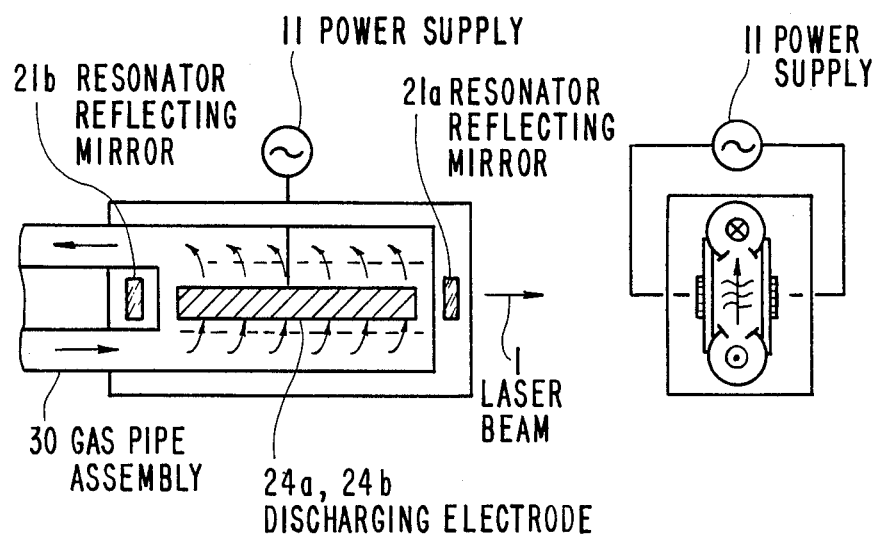
FIG. 6 is a schematic cross-sectional view of a fourth preferred embodiment of the present invention.

FIG. 6 illustrates a fourth preferred embodiment. The fourth embodiment employs a lateral excitation type structure for a laser beam emitter 20. Those parts which are identical to those of the first through third embodiments are denoted by identical reference numerals. A power supply 11 is contained in a main unit 10 (not shown), and is shown for reference only. In the lateral excitation type structure, a discharging direction, a laser beam direction, and a laser medium gas flowing direction are perpendicular to each other, making it possible to reduce the size of the laser beam emitter 20, which may advantageously be mounted on the distal end of a robot arm.

Figure 7:
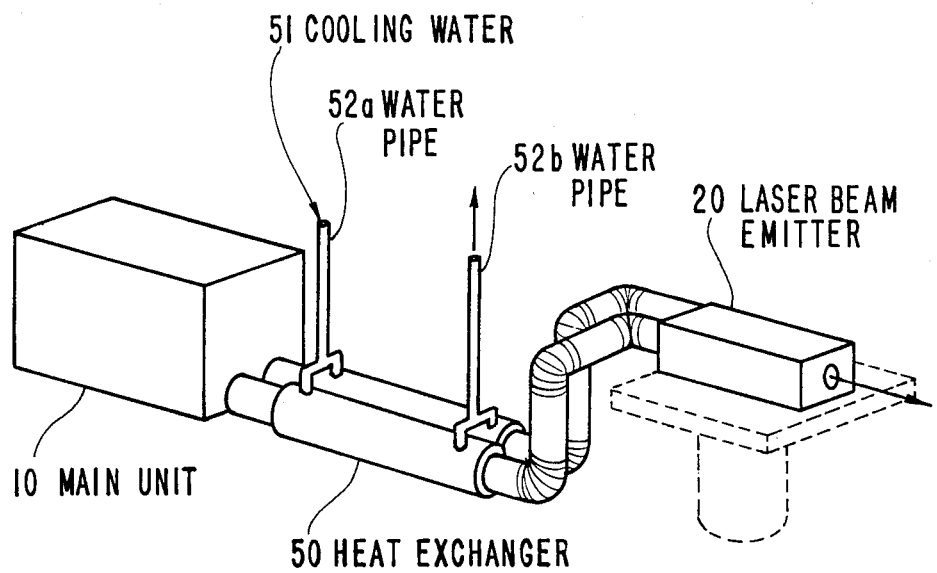
FIG. 7 is a perspective view of a fifth preferred embodiment of the present invention.
Figure 8:
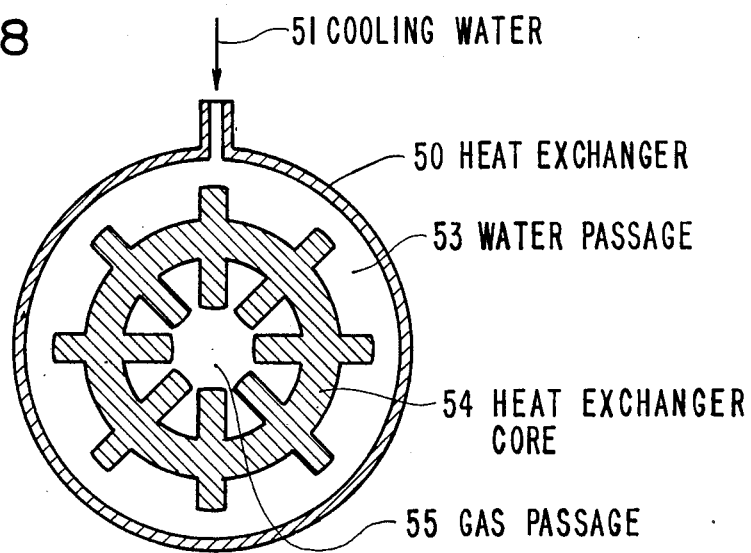
FIG. 8 is a cross-sectional view of a heat exchanger employed in the embodiment of FIG. 7.
Figure 9:
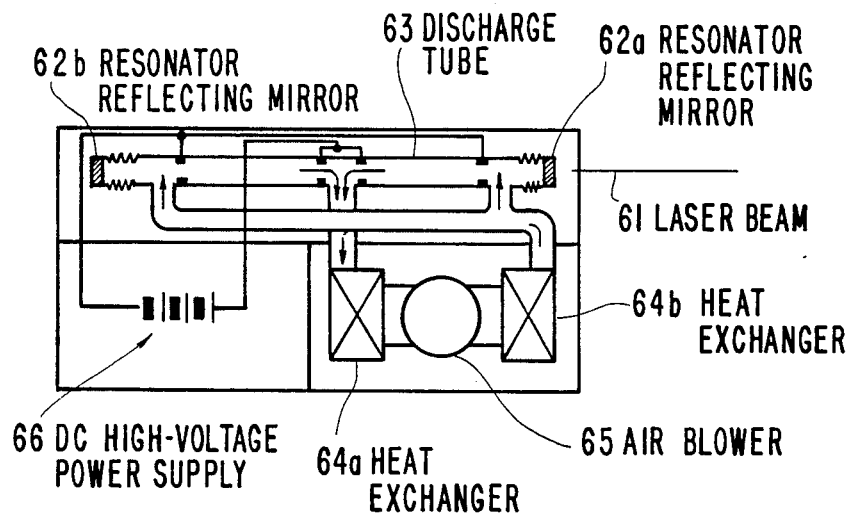
FIG. 9 is a cross-sectional view of a conventional high-speed axial-flow type gas laser device.
Figure 10:
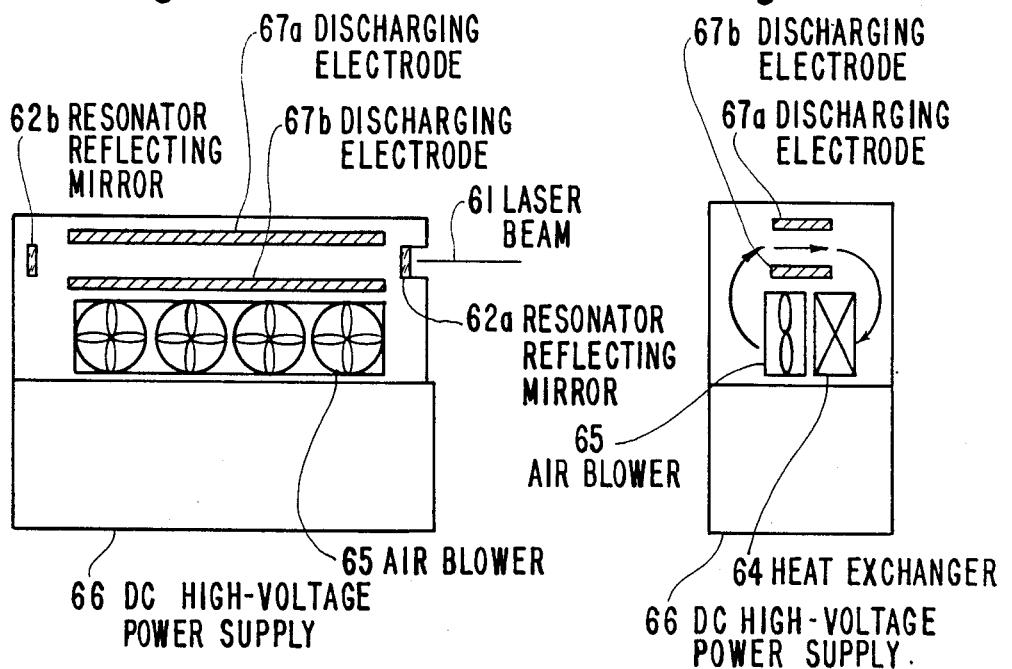
Figure 10:
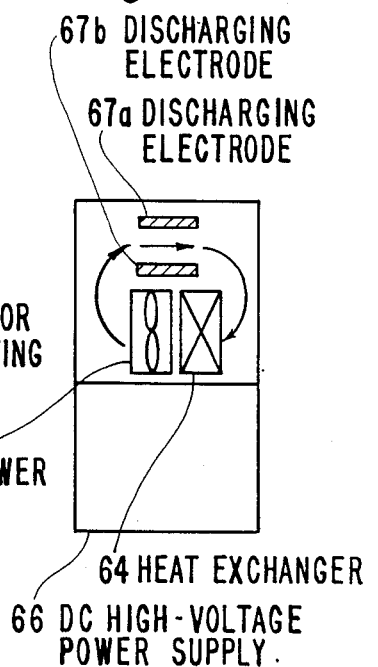

FIGS. 7 and 8 show a fifth preferred embodiment. In FIG. 7, a heat exchanger 50 is added to a gas pipe assembly 30 for cooling a laser medium gas. Cooling water 51 is circulated by a pump or the like (not shown) through water pipes 52a and 52b for supplying the cooling water.

FIG. 8 shows the heat exchanger 50 in cross section. Cooling water 51 enters a water passage 53 for passage of water. A heat exchanger core 54 transmits heat from the laser medium gas to the cooling water, and gas passage 55 passes the laser medium gas. While water is used as a coolant in the present embodiment, other coolants may be used. Where the gas pipe 20 is considerably long, the thermal resistance of the heat exchanger core may be reduced, and the gas may be cooled by air.

With the present invention, as described above, a main unit including a power supply and a heat exchanger, and a laser beam emitter are separate from each other and interconnected by a gas pipe assembly having a plurality of pipes which are coupled by flexible, expandable/contractable, and airtight members. Therefore, the laser beam emitter can easily be installed on a laser machining head, resulting in a simplified laser machining apparatus structure. Since the laser beam is not required to traverse a long distance using mirrors providing a folded laser beam passage, stable machining is made possible.

I claim:

1. A gas laser device having a laser medium gas circulated in an airtight container and a laser beam generated from the gas excited by an electric discharge, comprising:
   a main unit including an air blower for circulating the gas and a discharging power supply;
   a laser beam emitter including a discharging unit and resonator reflecting mirrors and being spaced from the main unit; and
   a telescopic gas pipe assembly coupling said main unit and said laser beam emitter, said gas pipe assembly including a plurality of highly rigid steel pipes and a plurality of flexible, expandable/contractable, airtight connector members for interconnecting the steel pipes.

2. A gas laser device according to claim 1, wherein said connector members are bellows.

3. A gas laser device according to claim 1, further comprising a robot having an arm, said laser beam emitter being mounted on a distal end of the arm of the robot, and said gas pipe assembly being mounted on the arm of the robot.

4. A gas laser device according to claim 1, further comprising a robot having an arm, said laser beam emitter being mounted on a distal end of the arm of the robot, and the arm of the robot comprises said gas pipe assembly.

5. A gas laser device according to claim 1, wherein said laser beam emitter is a lateral excitation type laser beam emitter.

6. A gas laser device according to claim 1, wherein said gas pipe assembly includes a heat exchanger disposed around the pipes of the gas pipe assembly and having a cooling medium.

7. A gas laser device according to claim 6, wherein said cooling medium is water.

8. A gas laser device according to claim 7, wherein said heat exchanger comprises a water passage, a heat exchanger core within the water passage, and a gas passage within the heat exchanger core.

9. A gas laser device according to claim 8, wherein the communicating means comprises an interior passageway passing through the robot and robot arm, and rotary seals provided at movable portions of the robot and robot arms.

10. A gas laser device having a laser medium gas and a laser being generated from the gas excited by an electric discharge, comprising:
    a main unit including an air blower for circulating the gas and a discharging power supply;
    a laser beam emitter including a discharging unit and resonator reflecting mirrors and being spaced from the main unit; and
    a robot having an arm, the laser beam emitter being mounted on a distal end of the robot arm, the robot and robot arm providing means for communicating the laser medium gas from the main unit to the laser beam emitter.

* * * * *